US 6,741,961 B2

(12) United States Patent
Lim

(10) Patent No.: US 6,741,961 B2
(45) Date of Patent: May 25, 2004

(54) LOW POWER AUDIO PROCESSOR THAT MULTIPLEXES COMPONENT DISTRIBUTION SIGNALS

(75) Inventor: Chae-Duck Lim, Ichon-shi (KR)

(73) Assignee: Hyundai Electronics Industries Co., Ltd., Kyungki-do (KR)

( * ) Notice: Subject to any disclaimer, the term of this patent is extended or adjusted under 35 U.S.C. 154(b) by 426 days.

(21) Appl. No.: 09/805,963

(22) Filed: Mar. 14, 2001

(65) Prior Publication Data

US 2002/0022958 A1 Feb. 21, 2002

(30) Foreign Application Priority Data

Aug. 18, 2000 (KR) ........................... 2000-47869

(51) Int. Cl.[7] ........................ G10L 21/02; G10L 19/02
(52) U.S. Cl. ........................ 704/229; 704/274
(58) Field of Search ................ 704/229, 500, 704/501, 274; 370/522, 311; 375/240.15; 455/343.1, 574; 708/205; 713/300–340, 500–503, 600, 601; 348/462

(56) References Cited

U.S. PATENT DOCUMENTS

| | | | | |
|---|---|---|---|---|
| 5,167,024 A | * | 11/1992 | Smith et al. | 713/322 |
| 5,423,045 A | * | 6/1995 | Kannan et al. | 713/322 |
| 5,502,496 A | * | 3/1996 | Hailey, Sr. et al. | 348/462 |
| 5,530,659 A | * | 6/1996 | Anderson et al. | 708/205 |
| 5,557,538 A | * | 9/1996 | Retter et al. | 375/240.15 |
| 5,577,044 A | * | 11/1996 | Oxford | 370/522 |
| 5,666,355 A | * | 9/1997 | Huah et al. | 370/311 |
| 5,675,808 A | * | 10/1997 | Gulick et al. | 713/322 |
| 5,887,179 A | * | 3/1999 | Halahmi et al. | 713/324 |
| 5,903,746 A | * | 5/1999 | Swoboda et al. | 713/501 |
| 5,925,134 A | * | 7/1999 | Solomon | 713/324 |
| 5,956,376 A | | 9/1999 | Nakaya et al. | 375/340 |
| 6,081,733 A | * | 6/2000 | Hietala et al. | 455/574 |

FOREIGN PATENT DOCUMENTS

| | | | | |
|---|---|---|---|---|
| EP | 0 343 528 A2 | | 5/1989 | H04M/1/72 |
| GB | 0 840 195 A2 | * | 6/1998 | G06F/1/08 |
| GB | 2 367 470 | * | 4/2002 | G06F/1/32 |
| JP | 08-095562 | * | 4/1996 | G10H/1/00 |
| JP | 2000-148279 | | 12/1998 | G06F/1/04 |
| JP | 2000-148279 | * | 5/2000 | G06F/1/04 |
| WO | WO 98/58460 | | 12/1998 | H04B/7/00 |
| WO | WO 00/43860 | | 7/2000 | G06F/1/32 |

OTHER PUBLICATIONS

Simunic et al ("Dynamic Voltage Scaling And Power Management For Portable Systems", Design Automation Conference, Jun. 2001.*

* cited by examiner

Primary Examiner—Richemond Dorvil
Assistant Examiner—Daniel A. Nolan
(74) Attorney, Agent, or Firm—Marshall, Gerstein & Borun LLP

(57) ABSTRACT

A low power audio processor is disclosed which includes: a bit stream processing unit for performing bit processing for an applied audio stream and for decoding the bit processed audio stream to have a format conducive to digital signal processing; a digital signal processing unit for receiving the decoded data from the bit stream processing unit to perform digital signal processing; a post processing unit for post processing audio data from the digital signal processing unit to output final audio data; and a host interface unit for interfacing with an external device to provide an audio parallel stream from the external device to the bit stream processing unit.

4 Claims, 3 Drawing Sheets

LOW POWER AUDIO PROCESSOR THAT MULTIPLEXES COMPONENT DISTRIBUTION SIGNALS

FIELD OF THE INVENTION

The present invention relates generally to an audio signal processor, and, more particularly, to an audio signal processor having a plurality of sub-processing units which are only driven when currently needed for processing.

BACKGROUND OF THE INVENTION

A conventional audio processor or signal processor digitally processes an application program by using a signal processing unit, which leads the whole signal processing unit to be driven at every flow, causing power consumption of the processor to be very high. Especially, when a high performance program is processed at a high frequency, unessential parts of the hardware are driven, and more power is consumed.

SUMMARY OF THE INVENTION

According to a preferred embodiment of the invention, a low power audio processor is provided that comprises: a bit stream processing unit for bit processing an applied audio stream into a bit processed audio stream, and for decoding the bit processed audio stream to have a format conducive to digital signal processing. A digital signal processing unit is also included for digital signal processing the decoded bit processed audio stream from the bit stream processing unit to develop a digital signal processed audio stream. The audio processor further includes a post processing unit for receiving the digital signal processed audio stream from the digital signal processing unit to develop final audio data. A host interface unit is included for interfacing with an external device to provide an audio parallel stream received from the external device to the bit stream processing unit. A power control unit is included for determining the power state for each of the bit stream processing unit, the digital signal processing unit, and the post processing unit in response to (1) a request signal and an acknowledge signal between the digital signal processing unit and the post processing unit, (2) a power down signal and (3) a source clock, the power control unit outputting a determined power state as a power mode signal. There is also an internal clock signal generator unit for generating clock signals in response to the power mode signal, each of the clock signals corresponding to a respective one of the bit stream processing unit, the digital signal processing unit, and the post processing unit.

BRIEF DESCRIPTION OF THE DRAWINGS

The following description of preferred embodiments refers to the accompanied drawings, in which.

DETAILED DESCRIPTION

Figure 1:
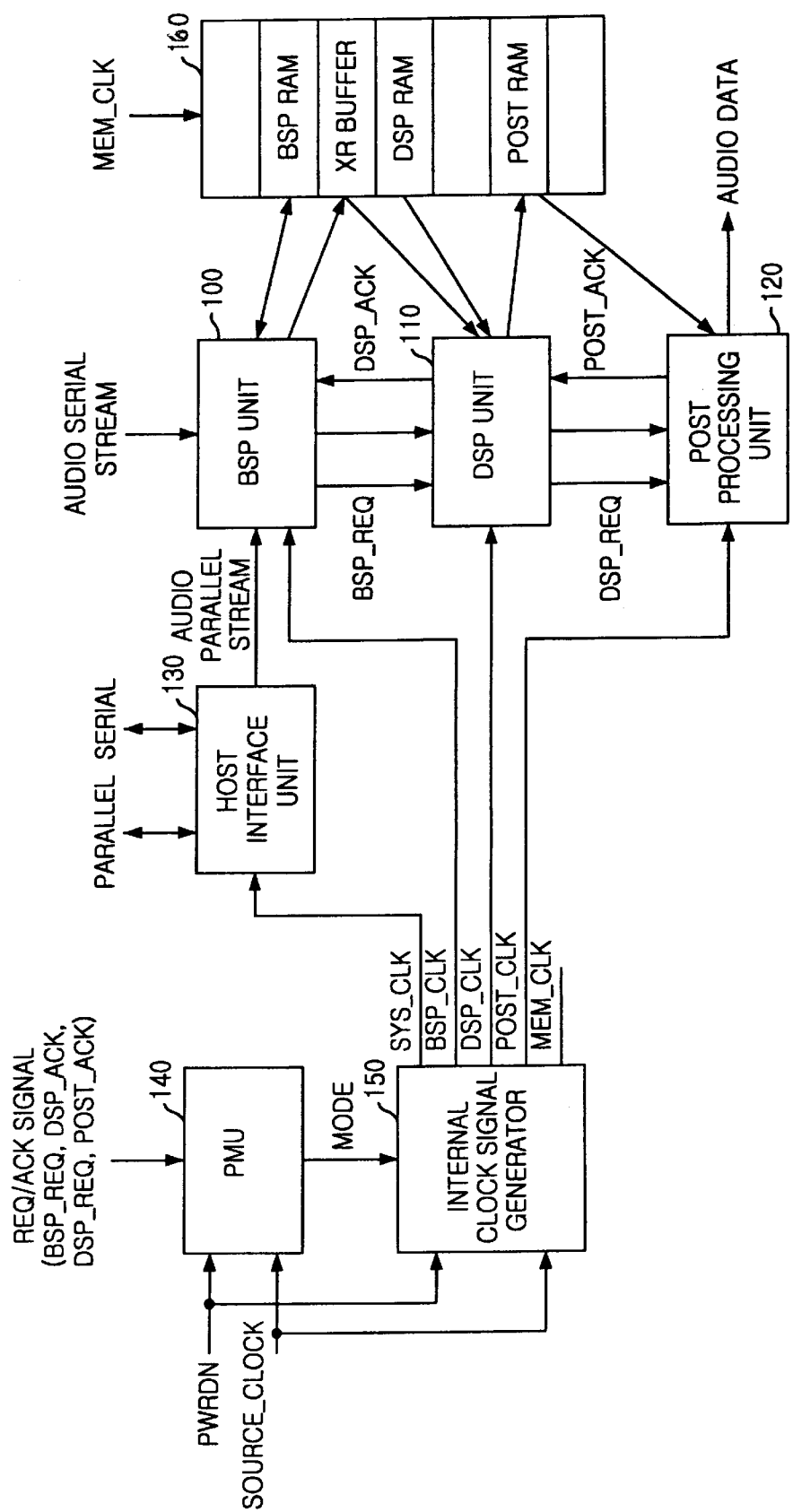
FIG. 1 is a block diagram of an exemplary audio processor constructed in accordance with the teachings of the present invention.

FIG. 1 is a block diagram of an exemplary audio processor constructed in accordance with the teachings of the present invention. As shown in FIG. 1, the disclosed audio processor comprises a bit stream processing (BSP) unit 100 for bit processing of an applied audio stream to compress the audio stream. The BSP unit 100 also decodes the bit processed audio stream to a format amenable to digital signal processing. A digital signal processing (DSP) unit 110 receives the decoded data in the digital signal processing format from the BSP unit 100 and performs digital signal processing by using a digital signal processing algorithm. A post processing unit 120 receives audio data from the DSP unit 110 and performs further post processing, such as equalizing processing, and outputs final audio data.

A host interface unit 130 is also included to interface with an external device through a parallel bus and/or a serial bus. The host interface unit 130 transmits an audio stream from an external device through the parallel bus to the BSP unit 100. The audio processor also includes a power control unit (PMU) 140 for determining idle states for each unit. The PMU 140 accomplishes this power control by using a request signal and an acknowledge signal between the DSP unit 110 and the post processing unit 120. These signals are generated in response to a power down signal PWRDN from outside and a source clock SOURCE_CLOCK to output the determined power state as a power mode signal.

The audio processor further includes an internal clock signal generator 150 for generating clock signals that correspond to each unit in response to the power mode signal to output each of the clock signals to the corresponding units.

A program memory is also included in the audio processor, which is coupled to the BSP unit 100, the DSP unit 110 and the post processing unit 120. The program memory 160 is driven by a memory clock MEM_CLK from the internal clock signal generator 150. The memory clock is driven when the BSP unit 100, the DSP unit 110 and the post processing unit 120 perform processing.

Still referring to FIG. 1, the BSP unit 100 performs the bit processing for the audio stream, analyzes the compressed data, and then converts the format of the compressed data to a format for digital signal processing. The DSP unit 110 performs typical audio algorithm processing and the post processing unit 120 outputs real time audio data. Therefore, the request signal and the acknowledge signal are transferred among the BSP unit 100, the DSP unit 110 and the post processing unit 120 to perform the processing sequentially in order of the BSP unit 100, the DSP unit 110 and the post processing unit 120, which confirms the start and end of processing that is performed at each unit. The request signal and the acknowledge signal are applied to the input of the PMU 140.

Since the idle state of each unit can be recognized from the request signals and the acknowledge signals, the PMU 140 specifies the power state based upon the request signals and the acknowledge signals. The PMU 140 then outputs the specified power state as the mode signal.

The internal clock signal generator 150 generates clock signals BSP_CLK, DSP_CLK, POST_CLK, each of which is applied to one of the corresponding units 100, 110 and 120, depending on the mode signal from the PMU 140. The clock signal generator 150 also generates the memory clock MEM_CLK to enable the memory 160 when one of the units 100, 110 and 120 performs a processing operation in response to a corresponding clock signal from the internal clock signal generator 150.

Figure 2:
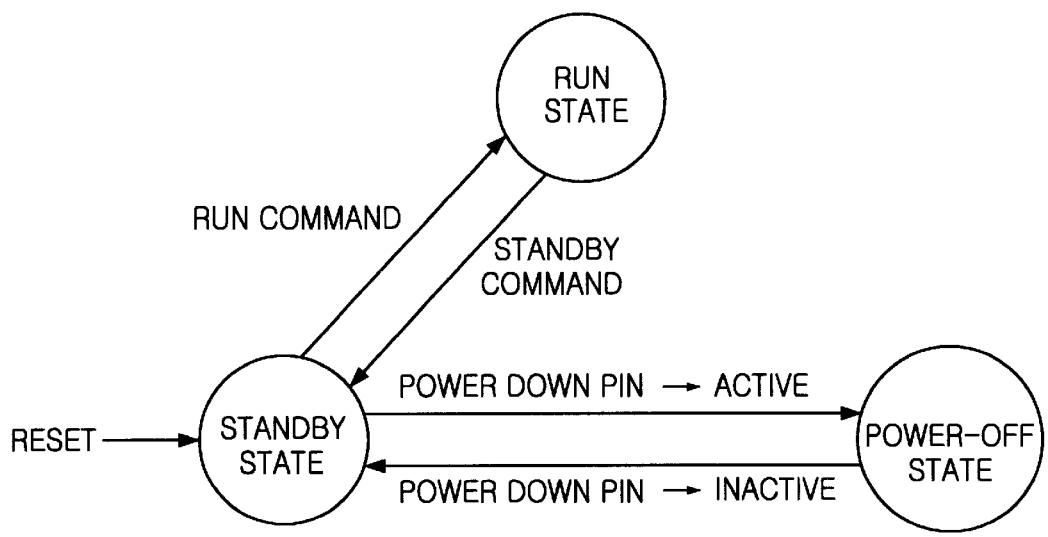
FIG. 2 shows an internal state diagram of the PMU of FIG. 1.

FIG. 2 shows an internal state diagram for the PMU 140 of FIG. 1. As shown in FIG. 2, the PMU 140 has three states; standby state, run state and power off state.

The standby state is a default state after reset. In this state, the internal clock signal generator 150 and the host interface unit 130 operate with a programmable clock of ½ of the source clock and the other processing units remain in a static state.

The run state is a state in which the host interface unit 130 performs parameter setup before a run command that is generated at the host interface unit 130. The state of each unit is also monitored to perform clock masking. During this state, the fundamental clock remains at ½ of the source clock and is divided by one, two or four as appropriate for the driven module.

Finally, when a power down pin is activated at the standby state, the state transits to the power off state in which the source clock becomes DC.

In other words, when processing is required during the standby state, (i.e., idle state), the run command is generated to transit to the run state. After that, a standby command is generated to transit to the standby state when the processing is ended. And, the standby state can transit to the power off state in which power is turned off through the external power down pin. Therefore, power consumption is reduced significantly.

Figure 3:
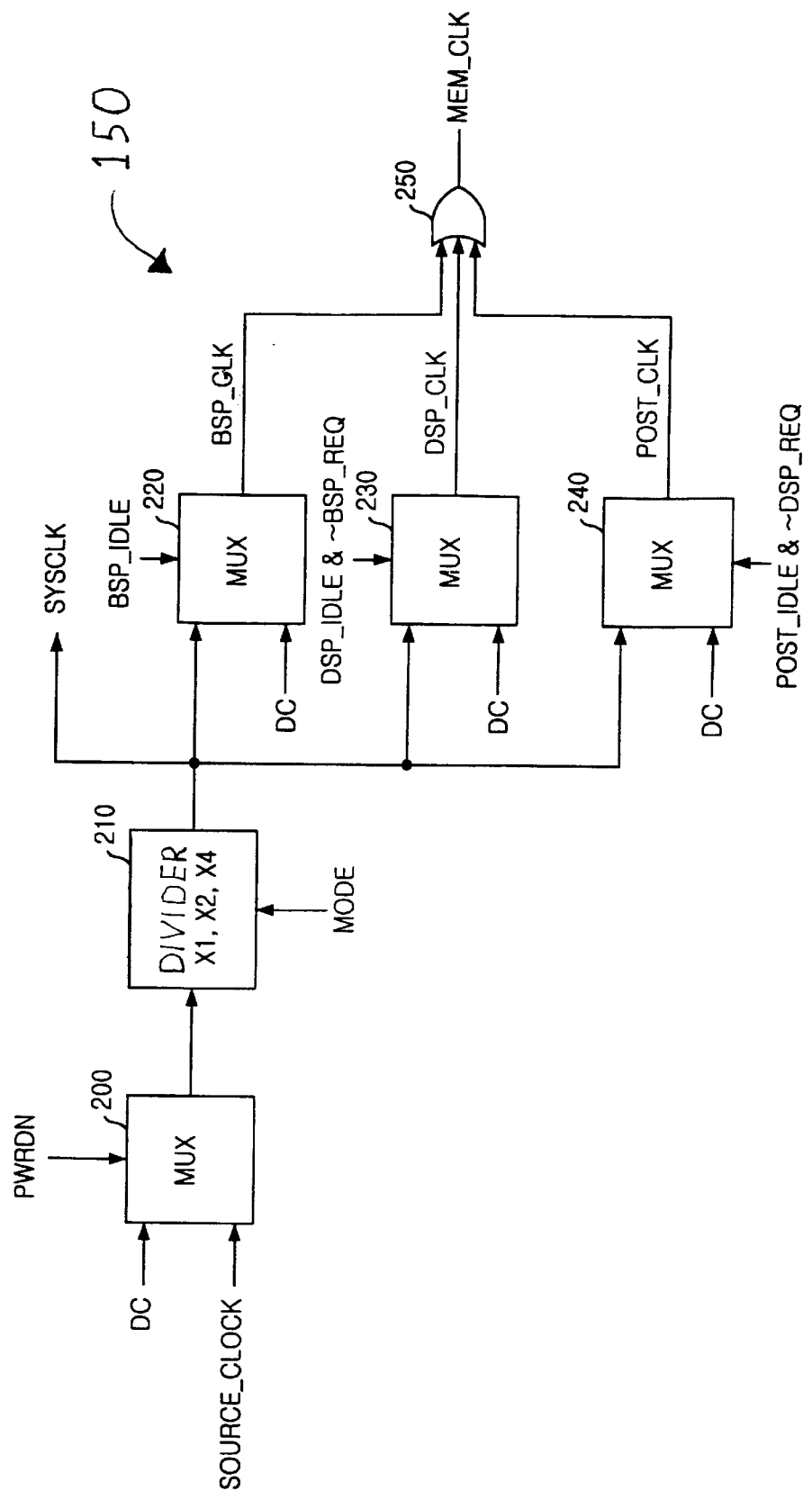
FIG. 3 offers an internal block diagram of the internal clock signal generator of FIG. 1.

FIG. 3 offers a block diagram of the internal clock signal generator 150 of FIG. 1. The internal clock generating means 150 includes a multiplexer 200 for selectively outputting one of a DC level and the source clock in response to the power down signal PWRDN. A divider 210 is included for dividing the output of the multiplexer 200 by one, two or four, and three multiplexers 220, 230 and 240. Each of the three multiplexors selects one of the corresponding clock signals applied from the branch 210 and the DC level in response to the idle state of the corresponding processing unit to output the selected signal to the corresponding processing unit.

Referring to FIG. 3, depending on the power state specified at the PMU 140, the internal clock signal generator 150 provides separate clock signals to the corresponding units.

The multiplexer 200 blocks input from the clock by selecting the DC instead of the source clock SOURCE_CLOCK during a power off state (identified by the power down signal PWRDN). It outputs the source clock SOURCE_CLOCK in all other states. The branch 210 branches the source clock SOURCE_CLOCK depending on the power mode to generate the clock signals for each unit.

After that, depending on the idle state of each processing unit, the clock signal branched at the branch 210 is applied to the BSP unit 100, the DSP unit 110 and the post processing unit 120.

On the other hand, data processed at each of the processing units is temporarily stored at the memory device 160. As flow occurs sequentially, data processed at the BSP unit 100 is the input of the DSP unit 110. Data that has then undergone digital signal processing at the DSP unit 110 is the input of the post processing unit 120. Therefore, the memory is driven by not only one of the processing units but by two of the processing units. Because the clock signal MEM_CLK for driving the memory 160 cannot be used commonly with the clock for each unit, the memory clock MEM_CLK is separately generated by a logic device 250 (i.e., an OR gate operating the clock signal BSP_CLK from the BSP unit 100, the clock signal DSP_CLK from the DSP unit 110, and the clock signal POST_CLK from the post processing unit 120) in the internal clock signal generator 150 as shown in FIG. 3.

As described above, the disclosed audio processing unit is subdivided functionally into the bit stream processing unit 100, the digital signal processing unit 110, and the post processing unit 120 for audio signal processing. Also, the power state of each unit 100, 110, 120 is determined by analyzing the state of each unit 100, 110, 120 at the power control unit 140. The internal clock signal generator 150 then generates clock signals depending on the determined power state to drive only one of the three units 100, 110, 120. Therefore, the disclosed device is capable of performing the application program by using a driving frequency that is about ½ to ⅓ of a conventional driving frequency so as to reduce power consumption of the audio processor.

While the teachings of the present invention have been explained in connection with particular examples, it will be apparent to those of ordinary skill in the art that the scope of this patent is not limited to those examples. On the contrary, this patent covers all structures fully within the spirit and scope of the appended claims.

What is claimed is:

1. A low power audio processor comprising:

a bit stream processing unit for bit processing an applied audio stream into a bit processed audio stream and for decoding the bit processed audio stream to have a format conducive to digital signal processing;

a digital signal processing unit for digital signal processing the decoded bit processed audio stream received from the bit stream processing unit to develop a digital signal processed audio stream:

a post processing unit for receiving the digital signal processed audio stream from the digital signal processing unit to develop final audio data;

a host interface unit for interfacing with an external device to provide an audio parallel stream received from the external device to the bit stream processing unit;

a power control unit for determining a power state for each of the bit stream processing unit, the digital signal processing unit and the post processing unit in response to: (1) a request signal and an acknowledge signal between the digital signal processing unit and the post processing unit, (2) a power down signal, and (3) a source clock, the power control unit outputting a determined power state as a power mode signal; and an internal clock signal generator unit for receiving the source clock and the power down signal and generating clock signals, each of the clock signals corresponding to a respective one of the bit stream processing unit, the digital signal processing unit and the post processing unit.

2. The audio processor as recited in claim 1, further comprising a memory device for temporarily storing data processed at each of the bit stream processing unit, the digital a signal processing unit and the post processing unit.

3. The audio processor as recited in claim 1, wherein the internal clock generator includes:

a first multiplexor for selectively outputting one of a DC level and the source clock in response to the power down signal;

a branch for branching the output of the first multiplexor into a predetermined number of branches; and second, third and fourth multiplexors, each for selecting respective ones of the clock signals from the branch and the DC level in response to the power state of a corresponding one of the bit stream processing unit, the digital signal processing unit and to post processing unit outputting a selected signal to a respective one of the bit stream processing, digital signal processing and post processing units to output the selected signal to the corresponding processing unit.

4. The audio processor as recited in claim 3, wherein the internal clock generator further includes a logic device for AND operating the outputs of the second, third and fourth multiplexors to drive a memory device.

* * * * *

UNITED STATES PATENT AND TRADEMARK OFFICE
CERTIFICATE OF CORRECTION

PATENT NO. : 6,741,961 B2
DATED : May 25, 2004
INVENTOR(S) : Chae-Duck Lim

It is certified that error appears in the above-identified patent and that said Letters Patent is hereby corrected as shown below:

<u>Title page,</u>
Item [75], Inventor, after "Chae-Duck Lim," please delete "Ichon-shi" and insert
-- Kyoungki-do -- in its place.

Signed and Sealed this

Tenth Day of August, 2004

JON W. DUDAS
*Acting Director of the United States Patent and Trademark Office*